United States Patent
Vyas et al.

(10) Patent No.: US 10,771,601 B2
(45) Date of Patent: Sep. 8, 2020

(54) DISTRIBUTING REQUESTS FOR DATA AMONG SERVERS BASED ON INDICATORS OF INTENT TO ACCESS THE DATA

(71) Applicant: Red Hat, Inc., Raleigh, NC (US)

(72) Inventors: Jay Vyas, Concord, MA (US); Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 219 days.

(21) Appl. No.: 15/595,562

(22) Filed: May 15, 2017

(65) Prior Publication Data
US 2018/0332149 A1    Nov. 15, 2018

(51) Int. Cl.
*H04L 29/08* (2006.01)
*H04N 21/258* (2011.01)
*H04L 29/06* (2006.01)

(52) U.S. Cl.
CPC ............ *H04L 69/329* (2013.01); *H04L 67/34* (2013.01); *H04L 67/42* (2013.01); *H04N 21/25808* (2013.01)

(58) Field of Classification Search
CPC ....... H04L 69/329; H04L 67/34; H04L 67/42; H04N 21/25808
See application file for complete search history.

(56) References Cited

U.S. PATENT DOCUMENTS

| | | | |
|---|---|---|---|
| 6,269,390 B1 * | 7/2001 | Boland | G06F 9/4881 711/120 |
| 7,814,065 B2 | 10/2010 | Chan et al. | |
| 8,051,418 B1 | 11/2011 | Dice | |
| 8,134,916 B2 | 3/2012 | Achlioptas et al. | |
| 8,239,524 B2 | 8/2012 | Arimilli et al. | |
| 8,365,181 B2 | 1/2013 | Flower et al. | |
| 8,935,203 B1 * | 1/2015 | Brooker | G06F 13/28 707/610 |
| 2005/0021759 A1 * | 1/2005 | Gupta | G06F 9/54 709/226 |
| 2011/0131326 A1 * | 6/2011 | Medard | H04L 67/1097 709/225 |

(Continued)

OTHER PUBLICATIONS

Wikipedia; "Kernel (operating system)—Wikipedia"; 2019; https://en.wikipedia.org/wiki/Kernel_(operating_system) (Year: 2019).*

(Continued)

*Primary Examiner* — Tonia L Dollinger
*Assistant Examiner* — Jihad K Boustany
(74) *Attorney, Agent, or Firm* — Kilpatrick Townsend & Stockton LLP (57) ABSTRACT

Requests for data can be distributed among servers based on indicators of intent to access the data. For example, a kernel of a client device can receive a message from a software application. The message can indicate that the software application intends to access data at a future point in time. The kernel can transmit an electronic communication associated with the message to multiple servers. The kernel can receive a response to the electronic communication from a server of the multiple servers. Based on the response and prior to receiving a future request for the data from the software application, the kernel can select the server from among the multiple servers as a destination for the future request for the data.

19 Claims, 4 Drawing Sheets

(56) References Cited

U.S. PATENT DOCUMENTS

| | | |
|---|---|---|
| 2011/0252127 A1 | 10/2011 | Iyengar et al. |
| 2013/0080732 A1 | 3/2013 | Nellans et al. |
| 2013/0151652 A1* | 6/2013 | Brech ................. G06F 16/9574 |
| | | 709/216 |
| 2013/0254246 A1* | 9/2013 | Lipcon ................ G06F 12/0866 |
| | | 707/823 |
| 2015/0347509 A1 | 12/2015 | Ahmed et al. |
| 2015/0378921 A1* | 12/2015 | Karippara ........... G06F 9/45533 |
| | | 710/308 |
| 2016/0352817 A1* | 12/2016 | Burba .................... H04L 67/06 |
| 2017/0019414 A1* | 1/2017 | Kacin .................. H04L 63/108 |

OTHER PUBLICATIONS

"DsmlSl Simplifies Integration of TSM With OneFS Scale-Out Storage," 2017 http://www.tectrade.com/wo-content/uploads/2017/02/ConcatdsmlSl_Storage_en_web.pdf.

"Open Source Object Storage for Unstructured Data: Ceph on HP ProLiant SL4540 Gen8 Servers," May 2014, http://h20565.www2.hpe.com/hpsc/doc/public/display?sp4ts.old=5287871&docLocale-en_US&docId=emr_na-c04288653.

Seppanen, E. et al., "High Performance Solid State Storage Under Linux," Department of Electrical and Computer Engineering University of Minnesota Minneapolis, MN 55455, 2010, http://citeseerx.ist.psu.edu/viewdoc/download?doi=10.1.1.178.1083&rep=rep1&type=pdf.

* cited by examiner

DISTRIBUTING REQUESTS FOR DATA AMONG SERVERS BASED ON INDICATORS OF INTENT TO ACCESS THE DATA

TECHNICAL FIELD

The present disclosure relates generally to multicomputer data transferring. More specifically, but not by way of limitation, this disclosure relates to distributing requests for data among servers based on indicators of intent to access the data.

BACKGROUND

A network can include client devices in communication with servers. A client device can be a computing device that accesses information or a service made available by a server. One example of a client device can include a laptop computer or desktop computer used to access webpage content over the Internet. A server can be a computing device that provides the information or service to a client device. One example of a server can include a webserver that provides webpage content to client devices.

The flow of data between the client devices and servers can be controlled so that the servers do not become overloaded. For example, if all of the client devices in the network only communicate with a single server, that server can become overloaded. This may result in high latency or server failure. One way to control the flow of data between client devices and servers is using a round-robin scheme, in which communications from client devices are distributed among the servers in a circular order.

DETAILED DESCRIPTION

There can be disadvantages to distributing communications between client devices and servers according to a round-robin scheme. For example, the round-robin scheme can result in a server handling a request from a client device simply because it is the server's turn in the round-robin scheme, rather than because the server has the appropriate capabilities to handle the request or is the best server to handle the request. As a particular example, a server may have data stored in a slower type of memory, such as a hard disk, and another server may have the data stored in a faster type of memory, such as cache memory or random access memory (RAM). But the round-robin scheme can result a request for the data being distributed to the server with the data stored in the slower type of memory, even though the other server can access the data faster. This may result in unnecessary latency.

Some examples of the present disclosure may overcome one or more of the abovementioned issues by using indicators that software applications intend to access data at a future point in time to distribute requests for the data among servers. For example, a client device can receive an indicator that a software application intends to access specific data at a future point in time. Examples of the specific data can include a specific file, piece of data, or memory page. Based on the indicator, the client device can communicate with multiple servers to determine if the servers already have the specific data available in a faster type of memory. If a server already has the specific data available in a faster type of memory, the client device can designate that server as a destination for a subsequent request for the specific data. This server can be referred to as a destination server. The client device can then transmit the subsequent request for the specific data to the destination server. By distributing requests for data to servers that already have the data stored in a faster type of memory, the time to access the data is reduced, thereby reducing latency associated with the requests.

As another example, a client device can receive an indicator that a software application intends to access specific data at a future point in time. Based on the indicator, the client device can transmit a communication to a server forewarning a server that the specific data will be requested in the future. This may enable the server to prepare to handle the request beforehand. For example, based on the forewarning, the server may obtain the specific data from a slower type of memory and store the specific data in a faster type of memory. The client device can then transmit a subsequent request for the specific data to the server. Forewarning the server can enable the server to prepare to handle the request, which may reduce latency associated with the request.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
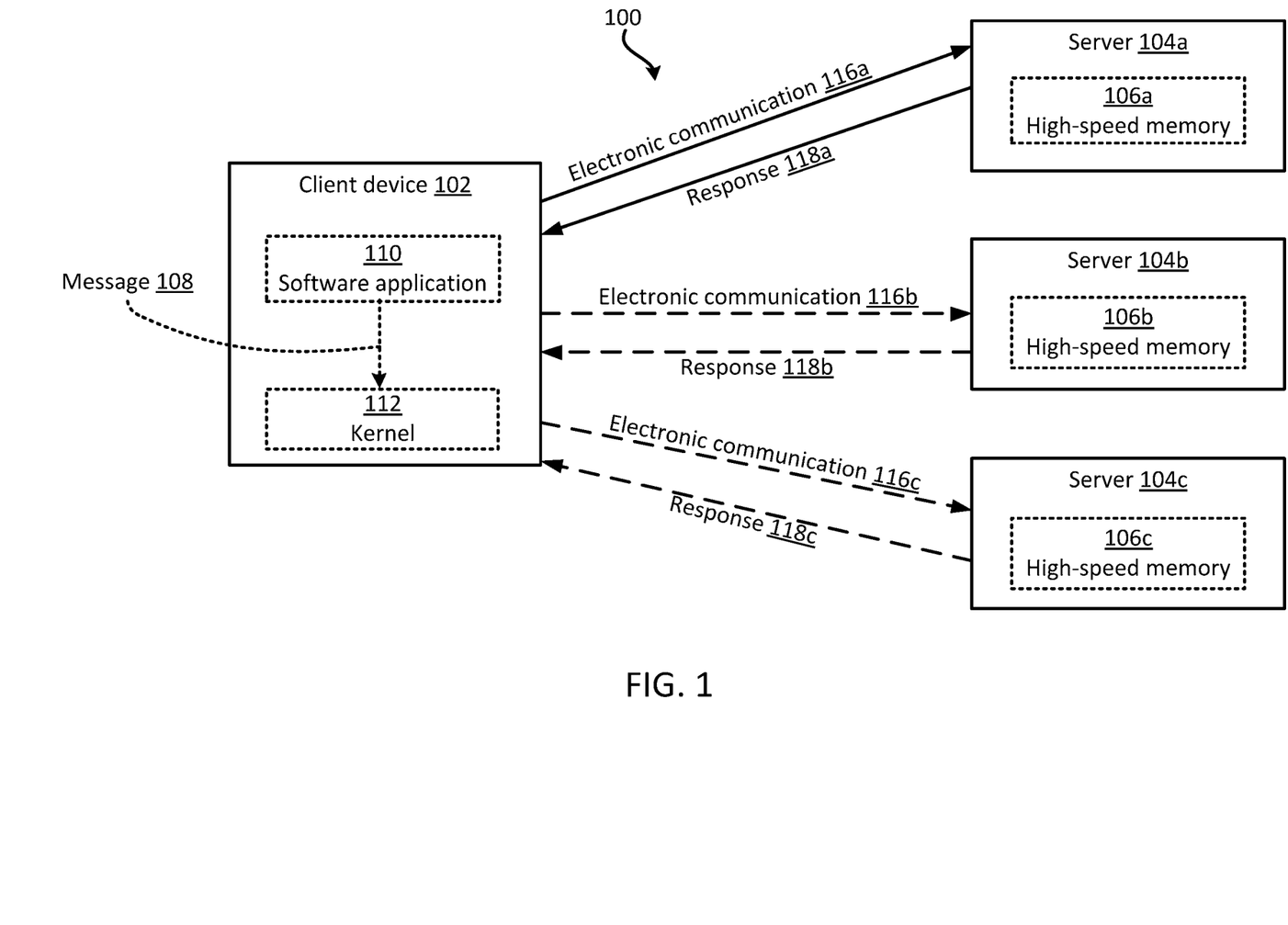
FIG. 1 is a block diagram of an example of a system for distributing requests for data among servers based on indicators of intent to access the data according to some aspects.

FIG. 1 is a block diagram of an example of a system 100 for distributing requests for data among servers 104a-c based on indicators of intent to access the data according to some aspects. The system 100 includes a client device 102. Examples of the client device 102 can include a laptop computer, desktop computer, mobile device, network hardware device, or any combination of these. Examples of a mobile device can include a cellular telephone, tablet, or e-reader. Examples of a network hardware device can include a router, switch, or hub.

The system 100 also includes servers 104a-c. Examples of the servers 104a-c can include a webserver, a database server, a file server, or any combination of these. The servers 104a-c can include high-speed memories 106a-c. Examples of a high-speed memory 106a can include cache memory, random access memory (RAM), dynamic random access memory (DRAM), persistent memory, or any combination of these. The servers 104a-c can also include lower-speed memories, such as a hard disk, a solid-state drive, read only memory (ROM), or flash memory. The high-speed memory 106a can be volatile and the lower-speed memory can be non-volatile.

The client device 102 can be in communication with the servers 104a-c. via a network. Examples of the network can include the Internet, a local area network (LAN), a wide area network (WAN), a cellular network, or any combination of these.

The client device 102 can execute a software application 110 and a kernel 112. Examples of the software application 110 can include a game, a utility application, an operating system, a website browser, or any combination of these. The kernel 112 can be a low-level software component for managing processes and resources of the client device 102.

The software application 110 can indicate to the kernel 112 that the software application 110 intends to access data at a future point in time. In some examples, the indicator includes a message 108 transmitted by the software application 110 to the kernel 112. The message 108 can include a command (e.g., a function call). The command can include one or more parameters, such as flags, arguments, references to the data to be accessed, settings, or any combination of these. In other examples, the indicator includes a flag set in memory by the software application 110. For example, the software application 110 can set a particular flag in a local memory of the client device 102, where the particular flag is associated with accessing specific data at a future point in time. The software application 110 can use any number and combination of techniques to indicate to the kernel 112 that the software application 110 intends to access data at a future point in time.

The kernel 112 can identify the indicator and, based on the indicator, transmit an electronic communication 116a to a server 104a. The electronic communication 116a can be, or can include, the message 108. For example, the kernel 112 can route the message 108 to the server 104a as the electronic communication 116a. In some examples, the electronic communication 116a can include one or more flags, arguments, references to the data to be accessed, settings, or any combination of these.

The server 104a can receive the electronic communication 116a and transmit a response 118a to the electronic communication 116a to the kernel 112. The response 118a can include, for example, an acknowledgement of the electronic communication 116a. Additionally or alternatively, the response 118a can indicate (i) whether the data is available in a high-speed memory 106a; (ii) whether the data will likely be available in the high-speed memory 106a at a future point in time; (iii) whether the server 104a is able (e.g., has capacity) to handle a future request for the data; or (iv) another status associated with the server 104a.

The kernel 112 can receive the response 118a to the electronic communication 116a. In some examples, the kernel 112 selects the server 104a to handle one or more future requests for the data based on the response. For example, the response 118a can indicate that the server 104a already has the data stored in cache memory. Based on the response, the kernel 112 can store an association between the software application 110 (or the data to be accessed) and the server 104a in a database. The kernel 112 can use the database to identify to which servers 104a-c to distribute requests for data. In other examples, the kernel 112 can select another server 104b-c to handle one or more future requests for the data based on the response 118a. For example, the response 118a can indicate that the server 104a does not have the data stored in cache memory, or in any memory. Based on the response, the kernel 112 can store an association between the software application 110 (or the data to be accessed) and another server 104b-c in the database.

In some examples, the kernel 112 transmits electronic communications 116a-c associated with the indicator to multiple servers 104a-c. The servers 104a-c can then each perform one or more operations based on the electronic communications 116a-c. For example, the servers 104a-c can each check their respective high-speed memory 106a-c to determine if data associated with the indicator is present. The servers 104a-c may additionally or alternatively transmit acknowledgements of the electronic communications 116a-c or other responses 118a-c back to the client device 102.

The kernel 112 can select a particular server to be the destination server based on the responses 118a-c from the multiple servers 104a-c. The kernel 112 can select the particular server according to one or more prioritization schemes or rules. In one prioritization scheme example, the kernel 112 selects servers that already have the data to be accessed stored in high-speed memory over servers that are likely to have the data stored in high-speed memory when needed. And the kernel 112 selects servers that are likely to have the data stored in high-speed memory when needed over other servers that provide other types of responses.

As a particular example of the abovementioned prioritization scheme, a response 118a from the server 104a can indicate that the server 104a already has the data to be accessed present in the high-speed memory 106a. Another response 118b from the server 104b can indicate that the server 104b will likely have the data to be accessed present in the high-speed memory 106b at a future point in time when the data is requested by the software application 110. Another response 118c from the server 104c may provide no information or ambiguous information about the location of the data or the ability of the server 104c to handle a future request for the data. Based on some or all of these responses 118a-c, the kernel 112 can select or designate the server 104a as the destination server (e.g., because the kernel 112 determined that the server 104a will have the data present in the high-speed memory 106a when needed).

In some examples, one or more of the servers 104a-c may not respond to the electronic communications 116a-c. In such examples, the kernel 112 may select a destination server from among the subset of servers that responded. In one particular example, the kernel 112 transmits electronic communications 116a-c to the servers 104a-c, but only servers 104a-b respond (e.g., because server 104c is busy or cannot handle a future request for the data). In such an example, the kernel 112 can select the destination server from among servers 104a-b, since servers 104a-b responded to the electronic communications 116a-c. For example, the kernel 112 can randomly select the destination server from among servers 104a-b.

The example shown in FIG. 1 is for illustrative purposes, and can be modified in any number of ways. For example, the system 100 can include any number and combination of client devices and any number and combination of servers. The client devices can transmit any number and combination of electronic communications to the servers and receive any number and combination of responses from the servers. As another example, the software application 110 can include the kernel 112, or vice-versa. As yet another example, the software application 110 can perform one or more of the above described functions of the kernel 112. For example, the software application 110 can determine that it is going to access data at a future point in time and communicate with the servers 104a, without communicating an indicator to the kernel 112 or otherwise using the kernel 112 as an intermediary. As another example, the software application 110 can be stored on a computing device that is different from the client device 102, and the client device 102 may be an intermediary between the computing device and the servers 104*a-c*.

Figure 2:
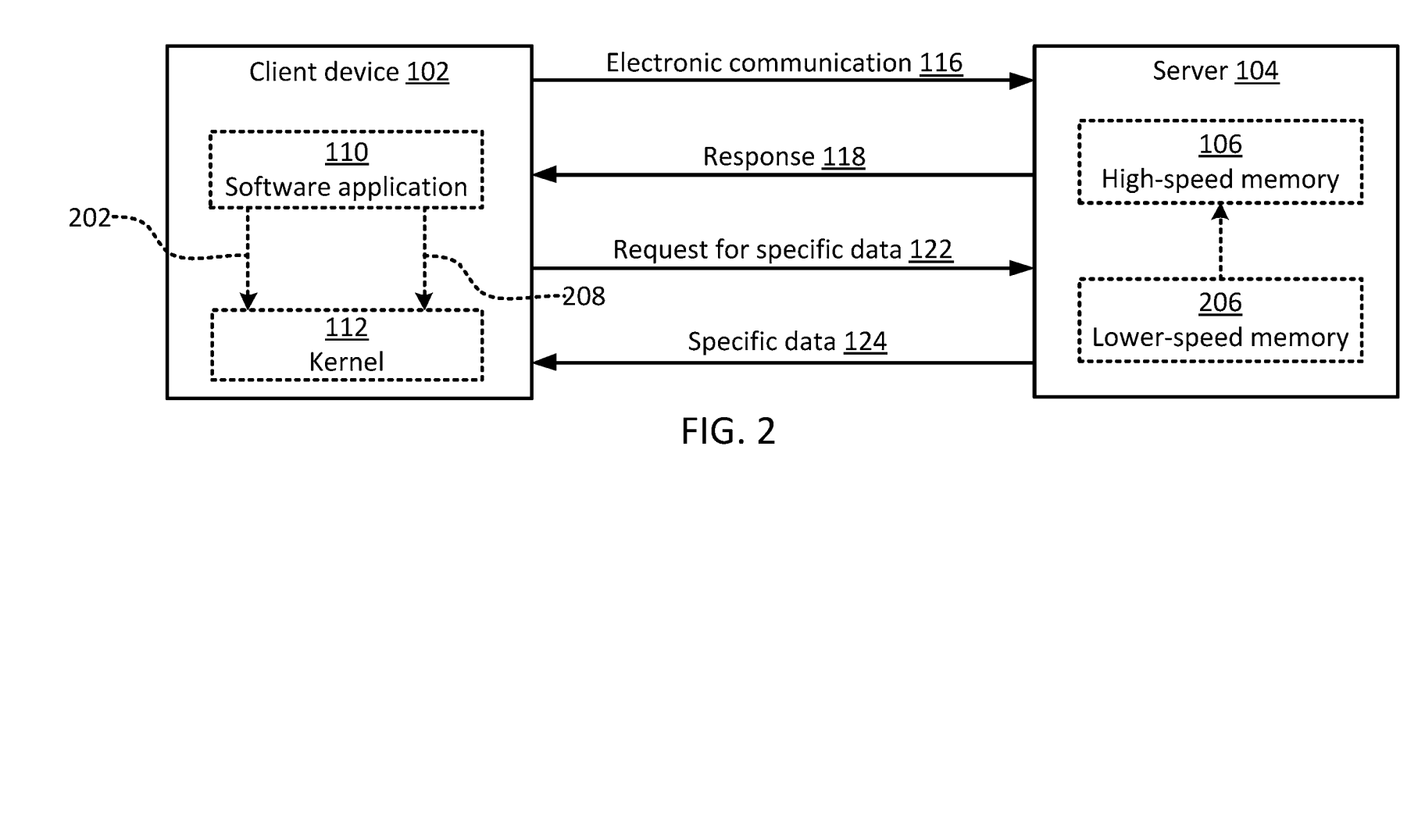
FIG. 2 is a block diagram of another example of a system for distributing requests for data among servers based on indicators of intent to access the data according to some aspects.

FIG. 2 is a block diagram of another example of a system for distributing requests for data among servers based on indicators of intent to access the data according to some aspects. This example is described with reference to a specific type of indicator of intent, a fadvise command 202. The fadvise command 202 may be a function call (e.g., a fadvise function call on a Linux operating system) or a result of a function call, such as a result of an fadvise function call. But other examples can have other implementations.

In this example, the software application 110 transmits a fadvise command 202 to the kernel 112. The software application 110 can transmit the fadvise command by calling an fadvise function. The fadvise command 202 can indicate an intention of the software application 110 to access specific data (e.g., file data) in a specific pattern in the future. The fadvise command 202 can have one or more flags set. The flags can include data-access pattern flags, such as (i) FADV_NORMAL indicating that the specific data is to be given no special treatment; (ii) FADV_RANDOM indicating that the specific data is to be accessed in a random order; (iii) FADV_SEQUENTIAL indicating that the specific data is to be accessed in a sequential order; (iv) FADV_WILL-NEED indicating that the specific data is to be accessed in the near future; (v) FADV_DONTNEED indicating that the specific data will not be accessed in the near future; (vi) FADV_NOREUSE indicating that data will only be accessed once; or (vii) or any combination of these. The fadvise command 202 can additionally or alternatively include other arguments. Examples of the other arguments can include a reference to the specific data, such as by filename; an offset value extending for a defined number of bytes within the specific data; or both of these.

The kernel 112 can receive the fadvise command 202 and determine an electronic communication 116 based on the fadvise command 202. For example, the kernel 112 can determine an electronic communication 116 that is, or includes, the fadvise command 202. As another example, the kernel 112 can use a database or algorithm to determine a command that is executable by the server 104 based on the fadvise command 202, and can incorporate the command into the electronic communication 116. The kernel 112 can use any number and combination of techniques to determine the electronic communication 116 based on the fadvise command 202. The kernel 112 can then transmit the electronic communication 116 to the server 104.

The server 104 can receive the electronic communication 116 and perform one or more operations based on the electronic communication 116. The operations can include (i) obtaining the specific data from a lower-speed memory 206; (ii) obtaining the specific data from a remote device, such as a remote database or a remote data store; (iii) storing specific data in a high-speed memory 106; (iv) storing the specific data in a local memory device; (v) determining a capability of the server 104 to handle a future request for the specific data; or (v) any combination of these. The server 104 can additionally or alternatively transmit a response 118 to the client device 102. The response 118 may indicate a result of the operations, an acknowledgement of the fadvise command 202, or both. For example, the response 118 may indicate that the server 104 retrieved the specific data from a lower-speed memory 206 and stored the specific data in the high-speed memory 106 for future use.

In the example shown in FIG. 2, the kernel 112 receives the response 118 and selects the server 104 as the destination server based on the response 118. Thereafter, if the software application 110 issues a subsequent request 208 for the specific data to the kernel 112, the kernel 112 can determine that the server 104 has been selected as the destination server for the subsequent request 208 and obtain the specific data from the server 104. For example, the kernel 112 can transmit a request for the specific data 122 to the server 104. The request for the specific data 122 can be, or can include, the subsequent request 208. The server 104 can receive the request for the specific data 122 and, in response, transmit the specific data 124 to the client device 102.

Figure 3:
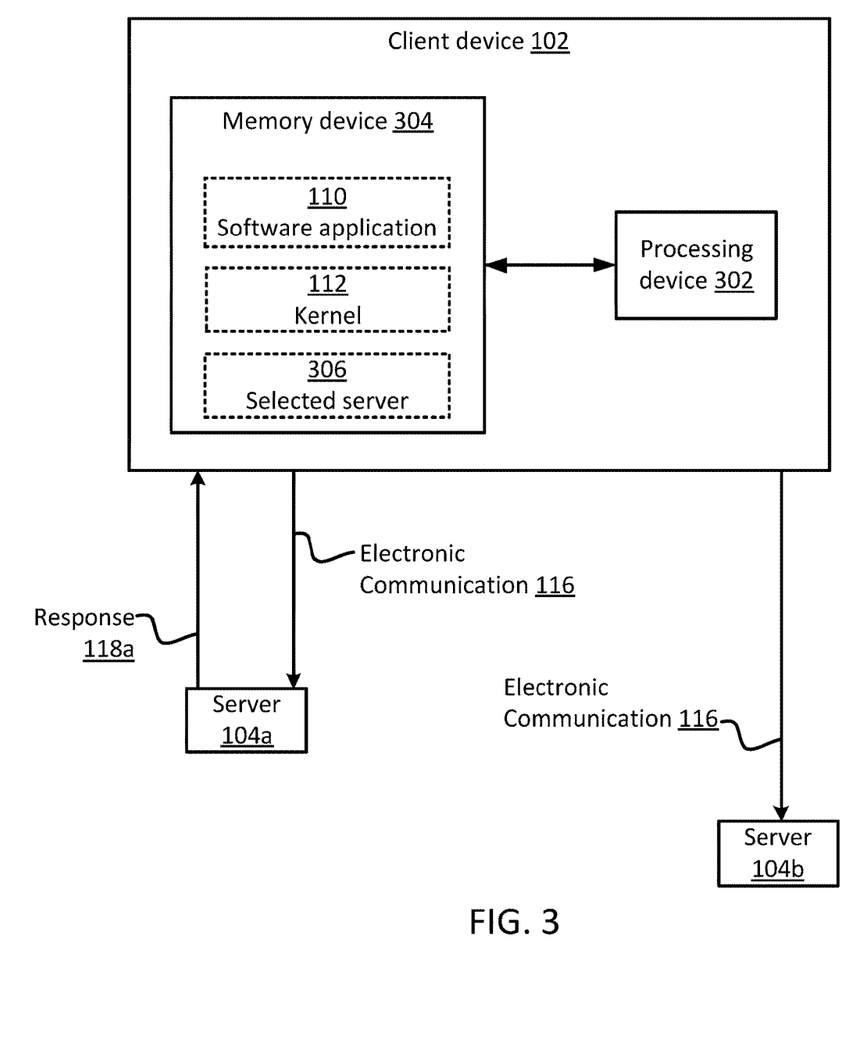
FIG. 3 is a block diagram of an example of a client device in communication with a server according to some aspects.

FIG. 3 is a block diagram of an example of a client device 102 in communication with a server 104 according to some aspects. The client device 102 has a processing device 302 communicatively coupled to a memory device 304. The processing device 302 can include one processing device or multiple processing devices. Non-limiting examples of the processing device 302 include a Field-Programmable Gate Array (FPGA), an application-specific integrated circuit (ASIC), a microprocessor, etc.

The processing device 302 can execute one or more operations for distributing data requests among servers. The processing device 302 can execute instructions stored in the memory device 304 to perform the operations. In some examples, the instructions can include processor-specific instructions generated by a compiler or an interpreter from code written in any suitable computer-programming language, such as C, C++, C #, etc.

Memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 304 can include the software application 110, the kernel 112, a selected server 306, or any combination of these. The kernel 112 can receive an indicator from the software application 110, transmit one or more electronic communications 116 associated with the indicator to one or more servers 104*a-b*, and receive at least one response 118*a* from at least one server 104*a*. The one or more electronic communications 116 may be the same as or different from one another. The kernel 112 can then select the server 104*a* as a destination for a future request for data based on the response 118*a*. The kernel 112 can store a name, internet protocol (IP) address, or other indicator of the server 104*a* in the memory device 304 as selected server 306. The kernel 112 may then obtain the data from the selected server 306 at a future point in time, such as in response to a future request for the data from the software application 110.

Although the components of FIG. 3 are shown as separate components in an integrated structure, other examples can include different configurations of the components. For example, the software application 110, kernel 112, and selected server 306 can be combined or otherwise integrated together. As another example, the memory device 304 and processing device 302 may not be integrated into a single structure, but rather may be distributed from one another (e.g., communicatively coupled over a network).

Figure 4:
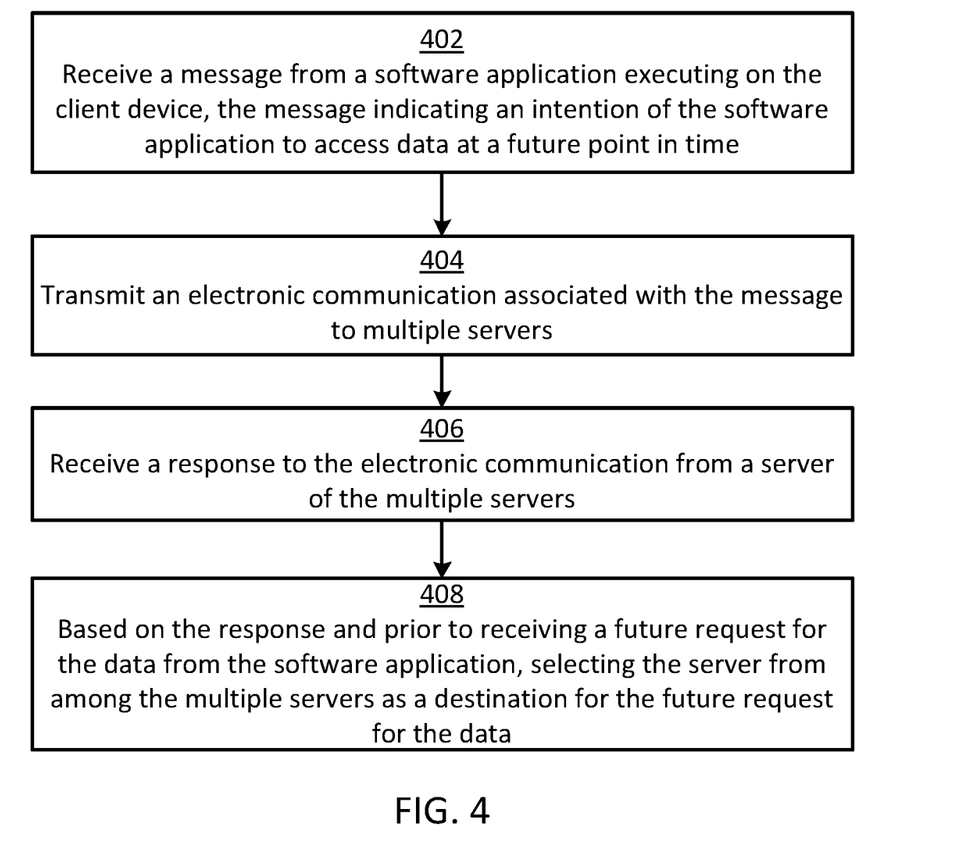
FIG. 4 is a flow chart of an example of a process for distributing requests for data among servers based on indicators of intent to access the data according to some aspects.

In some examples, the client device 102 implements the steps shown in FIG. 4. In other examples, the client device 102 implements more, fewer, or different steps than the steps depicted in FIG. 4. The steps of FIG. 4 are described below with reference to components of FIG. 3 described above.

In block 402, the kernel 112 receives a message from a software application 110 executing on the client device 102. The message can indicate an intention of the software application 110 to access data at a future point in time. In one example, the message includes a fadvise command. The message can include zero or more flags. The message may designate the data to be accessed at the future point in time.

In block 404, the kernel 112 transmits an electronic communication 116 associated with the message 108 to multiple servers 104a-b. For example, the kernel 112 can determine one or more electronic communications 116 based on the message and transmit the electronic communications 116 to the servers 104a-b. The electronic communications 116 can be the same or different from one another. In some examples, the electronic communications 116 include the message. For example, the client device 102 can relay the message from the software application 110 to the servers 104a-b as (or within) the electronic communications 116.

In block 406, the kernel 112 receives a response 118a to the electronic communication 116 from a server 104a of the multiple servers 104a-b. The response 118a can be based on one or more flags in, or other characteristics of, the electronic communication 116.

In block 408, the kernel 112 selects the server 104a from among the multiple servers 104a-b as a destination for a future request for the data. The kernel 112 can select the server 104a based on the response 118a from the server 104a and prior to receiving the future request for the data from the software application 110.

As a particular example of steps 404-408, the kernel 112 can transmit an electronic communication 116 that includes a flag indicating that the software application 110 expects to access the data within a predetermined time interval (e.g., less than one millisecond or one second). For example, the electronic communication 116 can include a fadvise command with an FADV_WILLNEED flag. The server 104 can detect the flag and determine if the server 104 has the data already stored in a high-speed memory, such as a cache memory. The server 104 can then respond to the client device 102 indicating that the server 104 has, or does not have, the data already stored in the high-speed memory. The kernel 112 can select the server 104 as the destination server based on the response 118 indicating that the server 104 has the data already stored in high-speed memory. Alternatively, the kernel 112 may not select the server 104 as the destination server based on the response 118 indicating that the server 104 does not have the data already stored in high-speed memory.

As another example of steps 404-408, the kernel 112 can transmit an electronic communication 116 that includes a flag indicating that the software application 110 expects to access data in a sequential order. For example, the electronic communication 116 can include a fadvise command with an FADV_SEQUENTIAL flag. The server 104 can detect the flag and determine if the server 104 will likely have the data stored a high-speed memory when the data is needed. The server 104 can then respond to the client device 102 indicating that the server 104 will likely have, or will likely not have, the data stored in the high-speed memory when the data is needed. The kernel 112 can select the server 104 as the destination server based on the response 118 indicating that the server 104 will likely have the data already stored in high-speed memory when the data is needed. Alternatively, the kernel 112 may not select the server 104 as the destination server based on the response 118 indicating that the server 104 will likely not have the data stored in high-speed memory when the data is needed.

As yet another example of steps 404-408, the kernel 112 can transmit an electronic communication 116 that includes a flag indicating that the software application 110 expects to access data in a random order. For example, the electronic communication 116 can include a fadvise command with an FADV_RANDOM flag. The server 104 can detect the flag and, for example, obtain the data from a lower-speed memory or clear a higher-speed memory to make room for the data. The server 104 can then respond to the client device 102 indicating that the server 104 obtained the data from the lower-speed memory or is capable of handling a future request for the data. The kernel 112 can select the server 104 as the destination server based on (i) simply receiving a response 118, such as an acknowledgement, from the server 104, (ii) the response 118 indicating that the server 104 obtained the data from the lower-speed memory, (iii) the response 118 indicating that the server 104 is capable of handling the future request for the data, or (iv) any combination of these. In some examples, the kernel 112 may randomly select the server 104 from among multiple servers that respond in the above manner(s).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A client device comprising:
a processing device; and
a memory device including:
   a software application that is executable by the processing device for transmitting a message to a kernel indicating an intention of the software application to access data at a future point in time, wherein the message includes an fadvise command indicating the data and a data-access pattern, and wherein the software application is configured to transmit the message to the kernel prior to requesting the data from the kernel; and
the kernel, wherein the kernel is configured for:
   receiving the message from the software application;
   in response to receiving the message and prior to the software application requesting the data:
      detecting the fadvise command in the message;
      based on detecting the fadvise command in the message, transmitting a plurality of electronic communications to a plurality of servers, the plurality of electronic communications indicating the data that the software application intends to access at the future point in time;
      receiving a response to an electronic communication among the plurality of electronic communications from a server among the plurality of servers, the server being configured to (i) determine a capability of the server to handle a future request for the data and (ii) generate the
response to the electronic communication based
on the determined capability;
based on the response, selecting the server from
among the plurality of servers as a destination
from which to obtain the data in order to
respond to the future request for the data from
the software application; and
based on selecting the server, storing an association between the server and the data in a database; and
subsequent to storing the association in the database:
receive a request for the data from the software
application;
retrieve the data from the server based on the
association in the database; and
provide the data back to the software application.

2. The client device of claim 1, wherein the message includes a flag indicating the data-access pattern.

3. The client device of claim 2, wherein:
the flag indicates that the software application expects to access the data within a predetermined time interval;
the electronic communication is configured to indicate to the server that the software application expects to access the data within the predetermined ti me interval;
the server is configured to determine if the server is capable of handling one or more future requests for the data within the predetermined time interval, wherein the server is capable of handling the one or more future requests for the data within the predetermined time interval if the server already has the data stored in a cache memory;
the response from the server is configured to indicate that the server is capable of handling the one or more future requests for the data within the predetermined time interval; and
the kernel is further configured for selecting the server from among the plurality of servers based on the response indicating that the server is capable of handling the one or more future requests for the data within the predetermined time interval.

4. The client device of claim 2, wherein:
the flag indicates that the software application expects to access data in a sequential order;
the electronic communication is configured to indicate to the server that the software application expects to access the data in the sequential order;
the server is configured to determine if the server is capable of handling one or more future requests for the data in the sequential order, wherein the server is capable of handling the one or more future requests for the data in the sequential order if the server will likely have the data stored in a cache memory at one or more future points in time corresponding to the one or more future requests for the data;
the response from the server is configured to indicate that the server is capable of handling the one or more future requests for the data in the sequential order; and
the kernel is further configured for selecting the server from among the plurality of servers based on the response indicating that the server is capable of handling the one or more future requests for the data in the sequential order.

5. The client device of claim 2, wherein:
the flag indicates that the software application expects to access data in a random order;
the plurality of electronic communications are configured to indicate to the plurality of servers that the software application expects to access the data in the random order;
each respective server in the plurality of servers is configured to determine if the respective server is capable of handling one or more future requests for the data in the random order; and
the kernel is further configured for:
receiving responses to the plurality of electronic communications from only a subset of servers in the plurality of servers, the subset of servers including the server and being capable of handling the one or more future requests for the data in the random order; and
selecting the server randomly from among the subset of servers based on receiving the responses from the subset of servers.

6. A method comprising:
transmitting, by a software application executing on a client device, a message to a kernel of the client device indicating an intention of the software application to access data at a future point in time, wherein the message includes an fadvise command indicating the data and a data-access pattern, and wherein the software application transmits the message to the kernel prior to requesting the data from the kernel;
receiving, by the kernel of the client device, the message from the software application;
in response to receiving the message and prior to the software application requesting the data:
detecting, by the kernel, the fadvise command in the message;
based on detecting the fadvise command in the message, transmitting, by the kernel, a plurality of electronic communications to a plurality of servers, the plurality of electronic communications indicating the data that the software application intends to access at the future point in time;
receiving, by the kernel, a response to an electronic communication among the plurality of electronic communications from a server of the plurality of servers, the server being configured to (i) determine a capability of the server to handle a future request for the data and (ii) generate the response to the electronic communication based on the determined capability;
based on the response, selecting, by the kernel, the server from among the plurality of servers as a destination from which to obtain the data in order to respond to the future request for the data from the software application; and
based on selecting the server, storing, by the kernel, an association between the server and the data in a database; and
subsequent to storing the association in the database:
receiving, by the kernel, a request for the data from the software application;
retrieving, by the kernel, the data from the server based on the association between the server and the data in the database; and
providing, by the kernel, the data back to the software application.

7. The method of claim 6, wherein the electronic communication includes the message, and transmitting the electronic communication to the plurality of servers comprises routing the message to the plurality of servers.

8. The method of claim 6, wherein the electronic communication and the message both include the a flag indicating the data-access pattern.

9. The method of claim 6, wherein:
the message includes a flag that indicates that the software application expects to access the data within a predetermined time interval;
the electronic communication indicates to the server that the software application expects to access the data within the predetermined time interval;
the response from the server indicates that the server is capable of handling one or more future requests for the data within the predetermined time interval, wherein the server is configured to generate the response based on the server determining that the server already has the data stored in a cache memory; and
the server is selected from among the plurality of servers based on the response indicating that the server is capable of handling the one or more future requests for the data within the predetermined time interval.

10. The method of claim 6, wherein:
the message includes a flag that indicates that the software application expects to access data in a sequential order;
the electronic communication indicates to the server that the software application expects to access the data in the sequential order;
the response from the server indicates that the server is capable of handling one or more future requests for the data in the sequential order, wherein the server is configured to generate the response based on the server determining that the server will likely have the data stored in a cache memory at one or more future points in time corresponding to the one or more future requests for the data; and
the server is selected from among the plurality of servers based on the response indicating that the server is capable of handling the one or more future requests for the data in the sequential order.

11. The method of claim 6, wherein the message includes a flag indicating that the software application expects to access data in a random order; wherein the plurality of electronic communications indicate to the plurality of servers that the software application expects to access the data in the random order; and wherein each respective server in the plurality of servers is configured to determine if the respective server is capable of handling one or more future requests for the data in the random order; and further comprising:
receiving responses to the electronic communication from only a subset of servers in the plurality of servers, the subset of servers including the server and being capable of handling the one or more future requests for the data in the random order; and
selecting the server randomly from among the subset of servers based on receiving the responses from the subset of servers.

12. A non-transitory computer-readable medium comprising instructions for a kernel, the kernel being executable by a processing device for causing the processing device to:
receive a message from a software application indicating an intention of the software application to access data at a future point in time, wherein the message includes an fadvise command indicating the data and a data-access pattern, and wherein the message is received from the software application prior to the software application requesting the data from the kernel;
in response to receiving the message and prior to the software application requesting the data:
detect the fadvise command in the message:
based on detecting the fadvise command in the message, transmit a plurality of electronic communications to a plurality of servers, the plurality of electronic communications indicating the data that the software application intends to access at the future point in time;
receive a response to an electronic communication among the plurality of electronic communications from a server among the plurality of servers, the server being configured to (i) determine a capability of the server to handle a future request for the data and (ii) generate the response to the electronic communication based on the determined capability; and
based on the response, select the server from among the plurality of servers as a destination from which to obtain the data in order to respond to the future request for the data from the software application; and
based on selecting the server, store an association between the server and the data in a database; and
subsequent to storing the association in the database:
receive a request for the data from the software application;
retrieve the data from the server based on the association between the server and the data in the database; and
provide the data back to the software application.

13. The non-transitory computer-readable medium of claim 12, wherein the message designates the data to be accessed.

14. The non-transitory computer-readable medium of claim 12, wherein the electronic communication includes the message.

15. The non-transitory computer-readable medium of claim 12, wherein the message indicates that the software application expects to access the data within a predetermined time interval, the response from the server indicates that the server already has the data stored in a cache memory, and further comprising instructions executable by the processing device for causing the processing device to select the server from among the plurality of servers based on the response indicating that the server has the data already stored in the cache memory.

16. The non-transitory computer-readable medium of claim 12, wherein the message indicates that the software application expects to access data in a sequential order, the response from the server to the electronic communication indicates that the server will likely have the data stored in a cache memory at the future point in time, and further comprising instructions executable by the processing device for causing the processing device to select the server from among the plurality of servers based on the response indicating that the server will likely have the data stored in the cache memory at the future point in time.

17. The non-transitory computer-readable medium of claim 12, wherein the message indicates that the software application expects to access data in a random order, and further comprising program code that is executable by the processing device for causing the processing device to:
receive responses to the electronic communication from only a subset of servers in the plurality of servers, the subset of servers including the server; and
select the server randomly from among the subset of servers based on receiving the responses from the subset of servers.

18. The non-transitory computer-readable medium of claim 12, wherein the software application is located on a computing device that is remote from the processing device, and further comprising program code that is executable by the processing device for causing the processing device to receive the message from the software application via a network.

19. The client device of claim 1, wherein the kernel is further configured to select the server from among the plurality of servers based on a prioritization scheme in which servers that have the data currently available in high-speed memory are prioritized over other servers that do not currently have the data available in high-speed memory.

* * * * *